May 19, 1942.  J. MERCIER  2,283,687
BRAKING ARRANGEMENT FOR THE WHEELS OF AIRCRAFT
Filed June 22, 1939  2 Sheets-Sheet 2

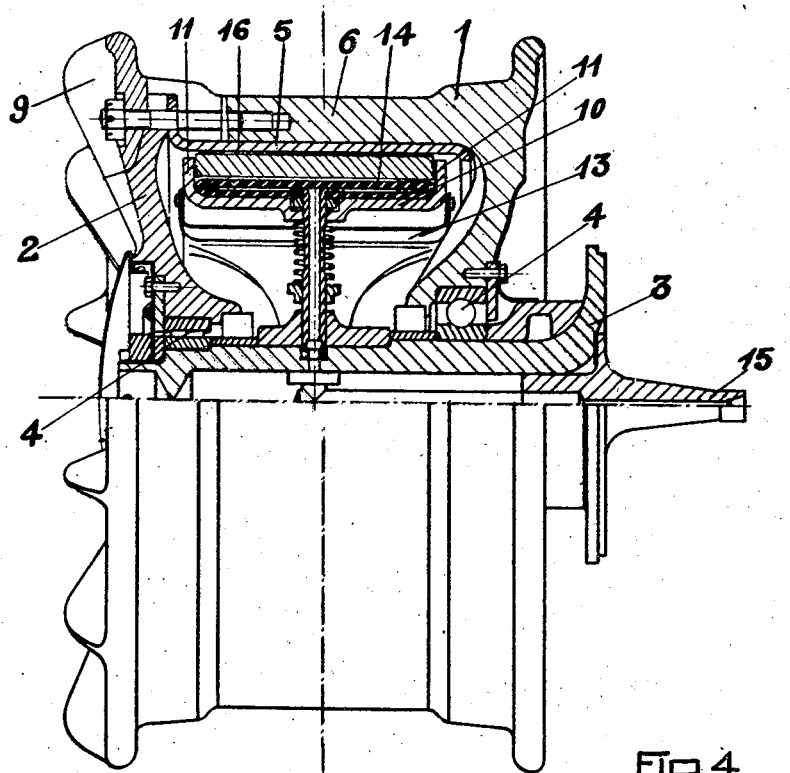
Fig. 1
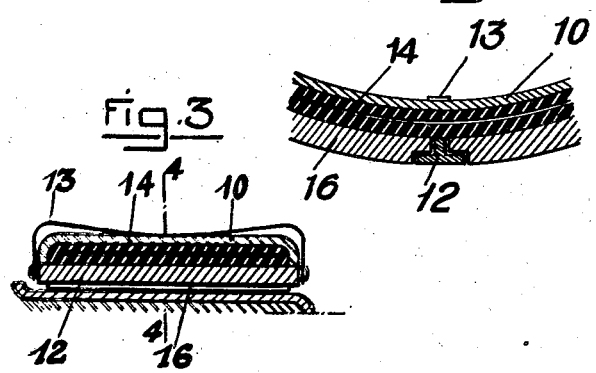
Fig. 4
Fig. 3
Jean Mercier
INVENTOR
his ATTY.

Jean Mercier
INVENTOR
By
his ATTY.

Patented May 19, 1942

2,283,687

UNITED STATES PATENT OFFICE 2,283,687

BRAKING ARRANGEMENT FOR THE WHEELS OF AIRCRAFT

Jean Mercier, Neuilly-sur-Seine, France

Application June 22, 1939, Serial No. 280,460
In Great Britain July 1, 1938

10 Claims. (Cl. 188—152)

The present invention relates to brakes for vehicles, and especially aircrafts, of the kind in which the brake shoes are displaced outwardly by the expansion of an expansible annulus or the like.

The object of the present invention is to provide an improved guiding and return into non-braking position of the shoes without complicating the structure or weakening the shoes.

A preferred embodiment of the present invention will be hereinafter described, with reference to the accompanying drawings, given merely by way of example, and in which:

Figure 1 shows partly in section an elevational side view of a wheel provided with a braking device according to the invention;

Figure 3 is a section on the line CD of Figure 2;

Fig. 4 is a part sectional view on the line 4—4 of Fig. 3.

Figure 2:
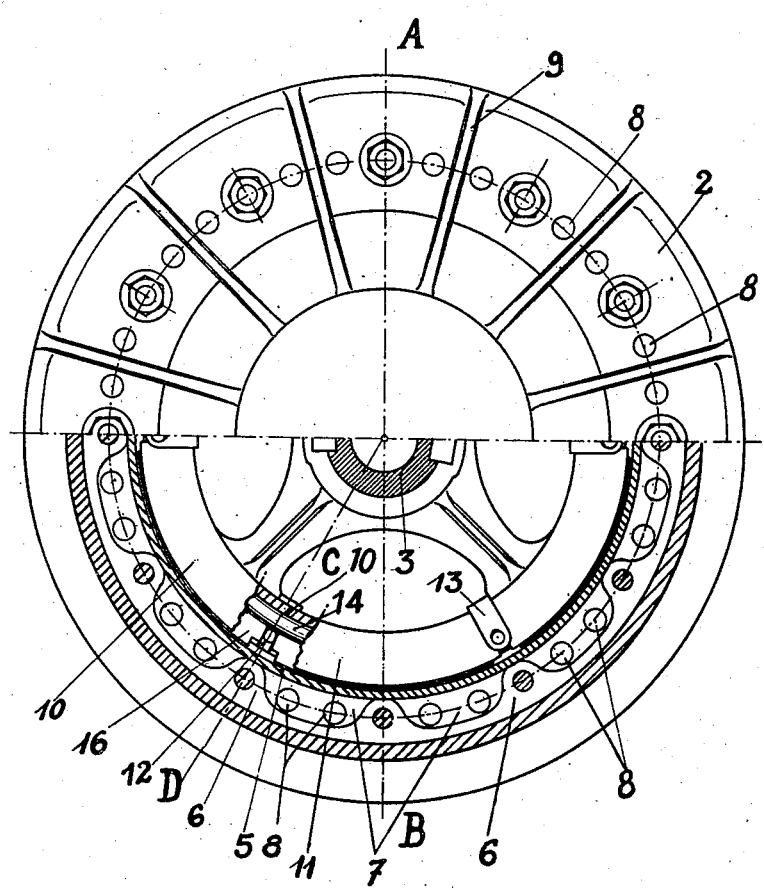
Figure 2 is a corresponding front view.

In the embodiment shown in these figures the wheel includes a wheel body 1 and a flange 2, connected together by bolts. The wheel is mounted on fixed spindle 3 through bearings 4 so as to be able to turn freely about the axis of said spindle. A brake drum 5 is fixed to the body 1 of the wheel, on which are provided projections 6 intended to receive this drum. Thus, between body 1 and drum 5 hollow spaces 7 are provided which communicate with the atmosphere through openings 8 intended to facilitate cooling. Ventilating vanes 9 rigid with flange 2 improve the circulation of air. The brake device comprises a circular support or torque frame 10 connected to the fixed spindle 3. This frame 10 is provided with flanges 11 (so that said support is of U-shaped section) having radial slots formed therein. Members 12 are slidably guided in these slots and consist of a steel bar, the intermediate part of which is of T-shaped section (Fig. 4) and the two ends of which are slidably guided in the slots of cheeks 11 and are engaged by the ends of an M-shaped leaf spring 13 the middle part of which bears against the inner side of the circular support 10. Inside the U-shaped structure 10—11 are disposed the inflatable tube 14 communicating with an external part 15 and six brake shoes 16. These shoes are provided at each end thereof with a notch adapted to accommodate a rib of member 12 corresponding to the horizontal branch of the T corresponding to the middle portion of the member in question.

The operation is as follows: In order to apply the brake, the expansible tube 14 is inflated, pushing them radially toward the brake drum. The friction against said drum tends to cause said shoes to turn together therewith but members 12 interposed between the brake shoes and fixed angularly with respect to the torque frame 10, oppose this movement. Members 12 are displaced radially and slide in the slots of cheeks 11, thus tensioning the spring 13. When the brake is released, tube 14 is deflated. Springs 13 return members 12 toward the centre and, as said members 12 bear against the outer face of the ends of shoes 16, said shoes are also moved inwardly, out of contact with brake drum 5.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

Having now described my invention, what I claim as new and desire to secure by Letters Patent is:

1. In a wheel brake device chiefly adapted for use on aircraft or the like, a brake drum connected with the usual rotating part of the wheel, a relatively stationary support provided with a hollow space therein, an inflatable means in said hollow space, brake shoes located between said inflatable means and brake drum, abutment, guiding and recoil means for said brake shoes, yieldingly connected to said support, and adapted to slide radially with respect to this latter, said abutment, guiding and recoil means being further located between the ends of two successive brake shoes and bearing thereupon, said guiding means consisting of metal bars, having a mean section of substantially T-shape.

2. In a device according to claim 1, the further feature residing in that the brake shoes have their ends provided with cut-away portions corresponding substantially to the T-shape, of the bars upon which they bear.

3. In a device according to claim 1, the feature residing in this that said recoil means consist of spring members hooked to said bars.

4. A wheel brake device chiefly adapted for use on aircraft which comprises, in combination, a brake drum, a circular frame fixed with respect to said drum coaxially therewith, a plurality of brake shoes adapted to cooperate with said drum, an expansible annular tube interposed between said frame and said shoes so as to apply, when inflated, said shoes against said drum, members carried by said frame so as to be radially slidable with respect thereto and interposed between two adjacent brake shoes so as to prevent rotation thereof, and parts rigid with said members and bearing against the outer faces of said brake shoes at the ends thereof for transmitting an inward thrust to said brake shoes, and elastic means carried by said frame for urging said last mentioned members inwardly toward the center of said frame.

5. A wheel brake device chiefly adapted for use on aircraft which comprises, in combination, a brake drum, a circular frame fixed with respect to said drum coaxially therewith, a plurality of brake shoes adapted to cooperate with said drum, an expansible annular tube interposed between said frame and said shoes so as to apply, when inflated, said shoes against said drum, members carried by said frame so as to be radially slidable with respect thereto and each interposed between two adjacent brake shoes so as to prevent rotation thereof, said shoes being provided, at their ends, with notches in their outer faces, projecting parts rigid with said members adapted to engage in said notches so as to permit of transmitting an inward thrust to said shoes, the outer faces of said projecting parts being so shaped as not to project beyond the outer surface of the brake shoes, and elastic means carried by said frame for urging said members inwardly toward the center of said frame.

6. A wheel brake device chiefly adapted for use on aircraft which comprises, in combination, a brake drum, a circular frame fixed with respect to said drum coaxially therewith, a plurality of brake shoes adapted to cooperate with said drum, an expansible annular tube interposed between said frame and said shoes so as to apply, when inflated, said shoes against said drum, rods parallel to the axis of the wheel movably carried by said frame so as to be radially slidably with respect thereto, each of said rods being interposed between two adjacent brake shoes so as to prevent rotation thereof, said shoes being provided, at their ends, with notches in their outer faces, projecting wings rigid with each of said rods adapted to engage in said notches so as to permit of transmitting an inward thrust to said shoes, the outer faces of said wings being so shaped as not to project beyond the outer surface of the brake shoes, and elastic means carried by said frame for urging said members inwardly toward the center of said frame.

7. A wheel brake device chiefly adapted for use on aircraft which comprises, in combination, a brake drum, a circular frame fixed with respect to said drum coaxially therewith, said frame including two annular flanges, with radial notches in said flanges, a plurality of brake shoes adapted to cooperate with said drum, an expansible annular tube interposed between said frame and said shoes so as to apply, when inflated, said shoes against said drum, inflexible rods parallel to the axis of the wheel slidably engaged at their ends each in two of these notches so as to be radially guided with respect to said frame, each of said rods being interposed between two adjacent brake shoes so as to prevent rotation thereof, said shoes being provided at their ends with recesses in their outer faces, projections rigidly carried by each of said rods adapted to engage in said recesses so as to permit of transmitting an inward thrust to said shoes, the outer faces of said projections being so shaped as to lie within the outer surface of said brake shoes, and elastic means carried by said frame for urging said rods inwardly toward the center of said frame.

8. A wheel brake device chiefly adapted for use on aircraft which comprises, in combination, a brake drum, a circular frame fixed with respect to said drum coaxially therewith, including a cylindrical part and flanges on either side thereof extending outwardly so as to form a structure of U-shaped axial section, with radial notches in said flanges, a plurality of brake shoes adapted to cooperate with said drum, an expansible annular tube interposed between said frame and said shoes so as to apply, when inflated, said shoes against said drum, inflexible rods parallel to the axis of the wheel slidably engaged at their ends each in two of these notches, each of said rods being interposed between two adjacent brake shoes so as to prevent rotation thereof, said shoes being provided, at their ends, with recesses in their outer faces, projections rigidly carried by each of said rods adapted to engage in said recesses so as to permit of transmitting an inward thrust to said shoes, the outer faces of said projections being so shaped as to lie within the outer surface of said brake shoes, and M-shaped leaf springs located in the radial planes of said rods, bearing, in their central portions, against the inner face of the cylindrical part of said frame and each connected, at each end to the ends of the corresponding rod, respectively, for urging said rod inwardly toward the center of said frame.

9. A wheel brake device, as claimed in claim 4, including projections on the wheel body and in which said brake drum is fixed on said projections so as to leave hollow spaces between body and drum, and openings in the lateral wall of the wheel to admit air to said hollow spaces.

10. A wheel brake device, as claimed in claim 4, including projections on the wheel body and in which said brake drum is fixed on said projections so as to leave hollow spaces between body and drum, and openings in the lateral wall of the wheel to admit air to said hollow spaces, and ventilating vanes on the outside of the lateral wall of the wheel.

JEAN MERCIER.